United States Patent [19]

Wiederkehr

[11] Patent Number: 4,991,986
[45] Date of Patent: Feb. 12, 1991

[54] MILLING CUTTER HAVING FACE AND PERIPHERAL CUTTING EDGES

[75] Inventor: Kurt Wiederkehr, Stetten, Switzerland

[73] Assignee: Asea Brown Boveri Ltd., Baden, Switzerland

[21] Appl. No.: 460,623

[22] Filed: Jan. 3, 1990

[51] Int. Cl.$^5$ .............................................. B26D 1/12
[52] U.S. Cl. ........................................ 407/53; 407/34; 407/63
[58] Field of Search .................. 407/53, 30, 34, 63, 407/54, 30, 34, 61

[56] References Cited

U.S. PATENT DOCUMENTS

| 1,148,597 | 8/1915 | Lewis ........................ 407/63 |
| 1,468,857 | 9/1923 | Browand . | |
| 2,188,743 | 1/1940 | Severson .................. 407/63 |
| 2,344,954 | 3/1944 | Aber . | |
| 2,344,956 | 3/1944 | Aber . | |
| 2,381,540 | 8/1945 | Horth . | |
| 4,597,695 | 7/1986 | Johnson .................... 407/34 |

FOREIGN PATENT DOCUMENTS 0425526  6/1911  France .................... 407/30

Primary Examiner—Frederick R. Schmidt
Assistant Examiner—Lawrence Cruz
Attorney, Agent, or Firm—Burns, Doane, Swecker & Mathis

[57] ABSTRACT

In a milling cutter for milling work with a setting angle of preferably 90°, the face cutting edges (1a, 2a) and the peripheral cutting edges (1, 2) are orientated in opposite directions for the chip removal. The peripheral cutting edges (1, 2) operating in each case in the milling direction each take up half the width of the entire milling cutter, as a result of which the latter can be used as a reversible milling cutter.

3 Claims, 1 Drawing Sheet

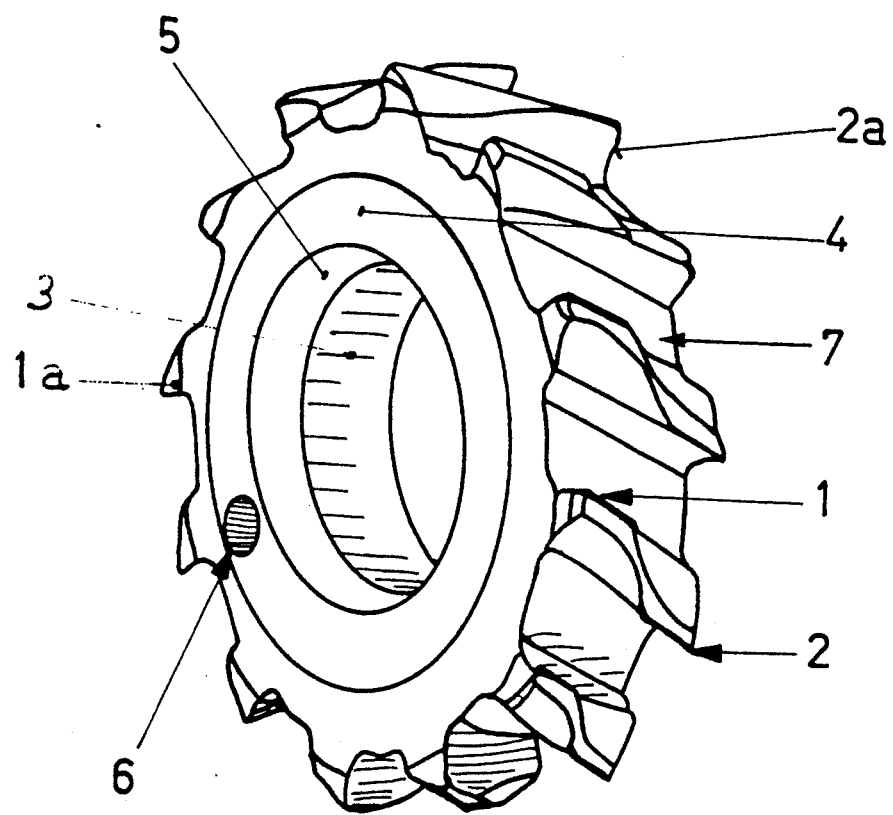

MILLING CUTTER HAVING FACE AND PERIPHERAL CUTTING EDGES

BACKGROUND OF THE INVENTION

1. Field of the invention

The present invention relates to a milling cutter according to the preamble of claim 1.

2. Discussion of Background

Milling cutters are produced in one-piece or multi-piece construction: smaller milling cutters generally in solid construction, larger milling cutters principally with firmly brazed-in cutting edges or—if possible in terms of design—with interchangeable blades or recently to an increasing extent with indexable inserts. The cutting material used is usually carbide or high speed steel (HSS), occasionally tool steel, oxide ceramics or sintered materials. The so-called shell end mills have proved successful for certain large surface milling work. In general, these milling cutters are produced in HSS-construction and they are preferably helical in the longitudinal direction, since this design operates more smoothly compared with those having cutting teeth arranged parallel to the axis. The shell end mills can start the cut on the work surfaces to be machined in the shape of an end corner, which substantially increases the milling capacity.

It is obvious that the milling cutter wears on both the face side and the peripheral side; regrinding is possible per se, but this operation always requires considerable effort, for the milling cutter must be ground down on the face side in each case by the depth which was in use on the peripheral side. In addition, the individual teeth must then be relief-ground on the face side, which always involves complicated machining which has to be carried out very accurately. These shell end mills can also only be used on one side, for the other head end is designed as a mounting and fixing part, for example having a cotter slot.

In order to avoid these disadvantages a new generation of milling cutters has been developed—the so called indexable-insert cutter heads. These corner face milling cutters with indexable inserts have proved successful for milling work with a setting angle around about 90°. In these milling cutters the resharpening of the blades on tool grinding machines is dispensed with by the use of indexable blades. There is therefore ideal interchangeability where the indexable blades are not brazed but are detachably connected to the basic tool body. The milling cutter must of course meet the requirement for maximum flatness and true-running accuracy in the assembled condition. This requires all individual components such as a basic tool body and clamping and cutting elements to be of the highest accuracy. However, even after these specifications have been complied with, such corner face milling cutters with indexable inserts are only suitable as milling cutters from a certain size of the basic tool body: the cutting elements, i.e. the indexable inserts, their attachment and also their associated chip space require a great deal of peripheral room, so that in small corner face milling cutters only a few cutting elements can be formed on the periphery. This is very disadvantageous in as much as the feed rate, that is the milling capacity depends on the number of cutting edges. If the milling operation has to be carried out with a small feed for this reason, the milling capacity with such a tool remains small per se and therefore uneconomical. But even in the case of large basic tool bodies, in which cutting edges which are sufficient per se could be provided, shortcomings which are reflected in the quality of the milling cutter repeatedly arise in practice when the cutting elements are indexed, despite all individual components being highly accurate.

SUMMARY OF THE INVENTION

Accordingly, one object of this invention, as defined in the claims, is to provide a novel milling cutter of the type mentioned at the beginning in such a way that it can be used as a solid reversible milling cutter.

The essential advantages of the invention can be seen from the fact that such a reversible milling cutter is able to produce the same milling capacity on both sides. This means that the reversible milling cutter, as soon as one side is blunt, can be turned around. Both the turning around and the replacement of the old reversible cutting ring by the new reversible cutting ring are direct actions which do not lead to any loss of time. This becomes noticeable in a positive manner in particular where expensive NC-machines are in use. But not only is the rapid use of the milling cutter ensured here, the absolutely essential high flatness and true-running accuracy, in particular during the reversing operation of the milling cutter, is not lost. This is always true in the present case, for the two stop surfaces of the reversible milling cutter have been machined so as to be plane-parallel to one another. The true-running accuracy is produced at the centering tapers provided on both sides. A continuous driving bore across the width of the reversible milling cutter ensures that the milling force can be mechanically transmitted. Since the reversible milling cutter is not intended to be resharpened, a further advantage is that the cutter can be applied with the full depth of cut available: the respective depth of cut possible depends on the width of the reversible milling cutter and is in each case half the width of the same, in opposite directions. The solid construction of the reversible milling cutter results in a further advantage: owing to the large number of teeth a high cutting capacity is achieved; in addition, the chip spaces can be of optimum configuration so that, from this point of view too, nothing more stands in the way of the high cutting capacity aimed at.

An exemplary embodiment of the invention is described below with reference to the drawing. All elements not necessary for immediately understanding the invention are omitted.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying figure, wherein a reversible milling cutter is shown in perspective representation.

DESCRIPTION OF THE PREFERRED EMBODIMENT

Referring now to the figure, it shows a reversible milling cutter which here, on account of its narrow dimensioning, can be designated as reversible cutting ring. The width of the milling cutter can of course vary; this depends, as will be explained below, on the depth of cut aimed at. The peripheral cutting edges 1, 2 are directed in opposite directions and in each case extend up to the center of the width of the reversible cutting ring. The face cutting edges 1a, 2a are likewise disposed in opposite directions to one another, these face cutting edges 1a, 2a conforming with the cutting angle of the associated peripheral cutting edge. Thus it is apparent that the milling cutter, which is preferably intended for work with a 90° setting angle, is reversible. Together with the technical precondition relating to the milling process, the flatness and true-running accuracy of the milling cutter must not deteriorate each time the milling cutter is reversed if loss in cutting capacity is to be avoided. For this purpose, each face of the reversible cutting ring, in the area of the bore 3, has a bearing surface 4 machined as accurately as possible for plane parallelism. In addition, the true-running accuracy must also be ensured at the same time; this is done by the bore 3, again on each side, merging at the face into a centering taper 5 which runs centrally relative to the mating piece in the arbor of the milling machine. These two provisions thus ensure that the original flatness and true-running properties of the milling cutter are retained both during the initial clamping and during every subsequent reversing operation. In principle, it is also possible to use the centering paper as a clamping taper. However, it will always be of advantage for the quality of the plane parallelism if the bearing surfaces 4 form the reference surfaces of the milling cutter, for the latter, in order to transmit the milling force, is in addition not clamped in the arbor solely by frictional force; on the contrary, a positive-locking receptacle in the form of a driving bore 6 is provided in the milling cutter, it is always attempted to provide the largest possible number of teeth. In addition, however, the high chip-removal milling capacity which can thus be achieved must not be restricted by a chip space 7 which has become too small. Optimum milling cutters therefore constitute a compromise between these two conditions. Of course, the width of the cutting edge in use, in particular in milling work at around 90° setting angle, also has to be taken into account. Since the reversible cutting ring shown here is preferably a tool suitable for NC, by which it is meant at the same time that resharpening of the cutting edges is out of the question for logistical and economical considerations, it is important that the entire cutting-edge width which is available in the milling direction and which, form the characteristic property of this milling cutter, in each case comes to half the width of the entire reversible cutting ring, must be in use. The overall width of the reversible cutting ring will therefore depend on the optimum milling capacity of one side of the milling cutter.

Obviously, numerous modifications and variations of the present invention are possible in light of the above teachings. It is therefore to be understood that, within the scope of the appended claims, the invention may be practiced otherwise than as specifically described herein.

That is claimed as new and desired to be secured by Letters patent of the United States is:

1. A milling cutter of unitary toroidal construction having a plurality of face cutting edges on opposite sides of said milling cutter, and a pair of peripheral cutting edges associated with each of said plurality of face cutting edges, each of said pair of peripheral cutting edges disposed on an outer circumference of said milling cutter, wherein the milling cutter, on each face side and on the peripheral side, is designed as a reversible milling cutter, a first cutting edge region of each of said pair of peripheral cutting edges being oriented in an opposite circumferential direction from a second cutting edge region of each of said pair of peripheral cutting edges, each of said first and second cutting edge regions of each of said pair of peripheral cutting edges being about half the width of the reversible milling cutter.

2. The milling cutter as claimed in claim 1, wherein an inner bore of the reversible milling cutter merges into a centering taper at each face.

3. The milling cutter as claimed in claim 1, wherein the reversible milling cutter has a driving bore.

* * * * *

UNITED STATES PATENT AND TRADEMARK OFFICE
CERTIFICATE OF CORRECTION

PATENT NO. : 4,991,986
DATED : February 12, 1991
INVENTOR(S) : Kurt Wiederkehr It is certified that error appears in the above-identified patent and that said Letters Patent is hereby corrected as shown below:

Title Page:

[30]     Foreign Application Priority Data

June 3, 1988 [CH]   Switzerland ................2128/88-9
  June 5, 1989 [PCT]......................PCT/CH89/00108

Signed and Sealed this

Twentieth Day of October, 1992

Attest:

DOUGLAS B. COMER

*Attesting Officer*          *Acting Commissioner of Patents and Trademarks*